& nbsp;

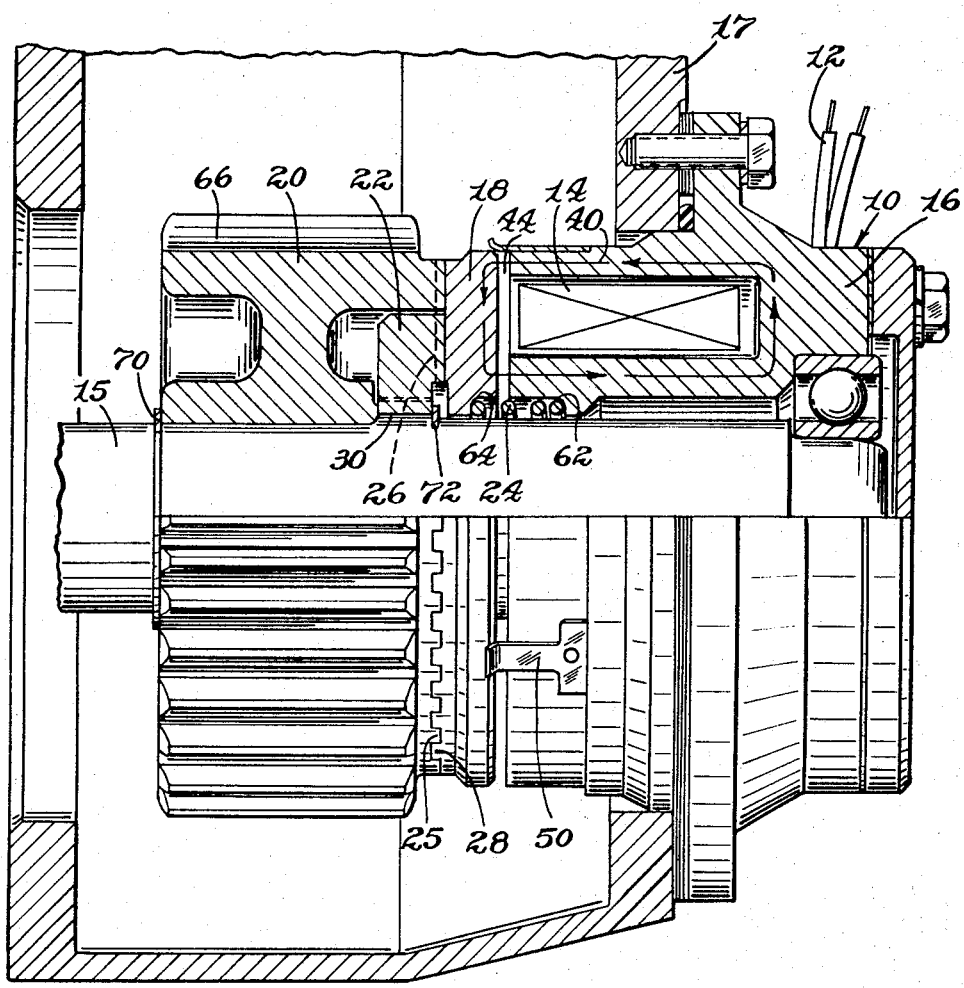

United States Patent Office 3,414,100
Patented Dec. 3, 1968

3,414,100
ELECTROMAGNETIC CLUTCH
Glenn S. Spencer, Big Flats, N.Y., assignor to The Bendix Corporation, a corporation of Delaware
Filed Jan. 3, 1966, Ser. No. 518,097
6 Claims. (Cl. 192—90)

ABSTRACT OF THE DISCLOSURE

A spring-engaged, electromagnetically-released clutch having a stationary electromagnetic coil and magnet body. The slidable armature which is spring-biased away from the coil and magnet body is the coupling member between coaxial torque-transmitting members having co-planar faces. One of the members is connected to a shaft for rotation therewith, while the other member may rotate free of the shaft. Suitable means, such as dentil teeth on the corresponding faces, may be engaged by the coupling member when the coil current is off to provide a fixed connection therebetween.

---

The present invention relates to electromagnetic clutches and, more particularly, to spring engaged, magnetically disengaged electromagnetic clutches having the advantages of a stationary field type clutch and the high torque properties of spring engaged clutches.

It is an object of the present invention to provide an electromagnetically disengaged clutch in which holding current is very low.

It is an object of the present invention to provide an electromagnetically disengaged clutch in which there is no connection between driving and driven members after clutch disengagement.

It is an object of the present invention to provide an electromagnetic clutch in which the engaging and disengaging member is a low intertia small mass member.

It is an object of the present invention to provide a novel electromagnetic clutch having a coupling member interconnecting the driving and driven members.

It is a further object of the present invention to provide a retarder member for assuring dentil tooth registry and deep dentil tooth engagement between the coupling member and the driving and driven members.

It is a further object of the present invention to provide a novel electromagnetic clutch having a coupling member which during disengagement is non-rotatable and may contact or abut the magnet body of the electromagnetic clutch and have a zero air gap.

It is a further object of the present invention to provide a novel electromagnetic clutch having a coupling member which is especially suited to coil energization during clutch disengagement, thereby achieving a high pull out force. Clutch overenergization during disengagement means low holding current and relatively small coil size with resultant cost savings in power, materials, and assembly costs.

It is a further object of the present invention to provide a novel, compact, lightweight, reliable spring engaged, magnetically disengaged electromagnetic clutch which is low in cost and high in performance and reliability.

The invention further lies in the particular organization of the various elements of the system and their cooperative association with one another to produce the beneficial results intended.

The foregoing objects and advantages of the invention will appear more fully hereafter from the consideration of the detailed description which follows, taken together with the accompanying drawing wherein one embodiment of the invention is illustrated. It is to be expressly understood, however, that the drawing is for the purpose of illustration and description and is not to be construed as to defining the limits of the invention. In the drawing wherein an electromagnetic clutch and brake embodying the invention is illustrated:

The single drawing is a longitudinal section, partly broken away, showing an electromagnetic clutch.

Turning now to the figure, numeral 10 indicates generally an electromagnetic clutch having a pair of lead wires 12 and 13 to deliver current to the coil 14 housed in the magnet body 16, contained within the clutch housing 17. In the embodiment shown, the magnet body 16 is stationary and is linked in the magnetic circuit to the annular coupling member 18 which is an annular torque transmitting or energy transmitting or absorbing member. Mounted coaxially with the coupling member 18 is a first power member or torque or energy transmitting member 20 which is journalled on the power shaft 15 and which has a first torque transmitting or absorbing surface 25 and a second torque transmitting or absorbing surface 66. In the embodiment shown, the surface 25 is a dentil tooth surface formed on the transverse end of the first power member 20 adjacent the coupling member 18. The second transmitting surface of the first power member 20 in the present embodiment is shown as having a gear portion formed on the outer radial periphery. A second power member 22 is splined or connected for rotation on splines 30, formed on the power shaft 15. The second power member 22 has a first torque transmitting or absorbing surface or dentil teeth 26 formed on the transverse end thereof adjacent the coupling member 18. The coupling member 18 has a torque transmitting surface or dentil teeth 28 formed on the transverse end thereof facing the first and second power transmitting members 20 and 22 respectively. The dentil surfaces 25, 26 and 28 are lying in the same plane to prevent unwanted bending moments and to simplify assembly of the clutch. Furthermore, the first and second power members 20 and 22 respectively and the coupling member 18 each may have the same number of dentil teeth cut therein to simplify manufacture. Lock rings 70 and 72 position the power transmitting members 20 and 22 on the power shaft 15.

A resilient member which may be a coil spring 24 is compressively confined between the coupling member 18 and the magnet body member 16 for biasing the coupling member into engagement with the first and second power transmitting members. A recess 62 is formed in the magnet body 16 and a recess 64 formed in the coupling member 18 to receive the resilient spring member 24.

The line 40 shows the path of the magnetic flux in the magnet body member 16 and across the axial air gaps 44. It will be noted that when the magnet is energized, that the coupling member 18 can be drawn into intimate contact with the magnet body 16 such that the axial air gaps 44 are reduced substantially to zero. This permits an exceedingly low value of holding current. In view of the low holding current, coil size may be significantly reduced, saving considerable expense in the cost of manufacture. Further, the low value of holding current reduces the cost of supplying power to the unit.

One application for the clutch shown in the present invention is for the coupling clutch on a four wheel drive for a motor vehicle. It matters not whether the power input on such drive is through the gear teeth 66 or through the shaft 15. In either event, when the coupling member 18 is adjacent the magnet body 16 such that the clutch is decoupled, the gear members or power members 20 and 22 are free to rotate independently of each other and there is no interconnection between the two. When, however, the holding current is released, the spring 24 engages the power members 20 and 22 and couples them such that the additional two wheels of the drive would receive torque. It is to be noted that the retarder springs or resilient members 50 which are fastened as by rivets or welding to the housing 60 are adapted to enable the gear members or gear surfaces 25 and 26 and 28 to have deep dentil engagement.

The present invention, as can be readily appreciated, achieves its stated objects, provides a lightweight, simple, low cost electromagnetic clutch which offers the advantages of a stationary field type clutch, that is, one in which there are no slip rings and, therefore, no arcing and no pitting and low assembly expense, etc. and the advantages of a spring engaged clutch with its higher torque transmitting capabilities. Further, it can be seen that the coupling member, because of its low inertia, may be coupled and decoupled to the magnet body 16 without causing it any harm. Further, the lightweight coupling member is readily movable on the power shaft 15, thus significant savings are achieved in terms of cost, weight and power consumption.

I claim:

1. In an electromagnetically-controlled clutch the combination of:
    a housing means;
    a coil contained within said housing;
    a power shaft member;
    a first power member having a fixed connection to said power shaft;
    a second power member journalled to said power shaft;
    a coupling member to interconnect said first and second power members;
    said coupling member axially movable relative to said coil between a first and second position;
    said coupling member when in said first position substantially in contact with said coil such that torque is not transmitted and in contact with said first and second power members for transmitting power therebetween when in said second position;
    said first power member having a first torque-transmitting surface formed thereon;
    said second power member having a first torque-transmitting surface formed thereon;
    said coupling member having torque-transmitting means engaging said first torque-transmitting surfaces of said first and second power members; and
    said coupling member and said first and second power torque-transmitting surfaces each having dentil teeth mating in the same plane.

2. The clutch as claimed in claim 1 wherein:
    said dentil teeth in said coupling member are face splines formed on one transverse end of said coupling member.

3. The clutch as claimed in claim 1 wherein:
    resilient means biases said coupling member into engagement with said first and second power members.

4. The clutch as claimed in claim 2 wherein:
    retarder means are fixedly connected relative to the housing means to assure deep dentil tooth engagement between said coupling member and said first and second power members.

5. The clutch as claimed in claim 2 wherein:
    said first power member disposed axially intermediate of said power member and said coupling member; and
    said first power member disposed raially inwardly of said second power member.

6. The clutch as claimed in claim 2 wherein:
    said second power member has a second torque transmitting surface formed thereon to enable torque to be transmitted from said first power member through said coupling member.

References Cited

UNITED STATES PATENTS

| | | | |
|---|---|---|---|
| 1,288,270 | 12/1918 | Stuart | 192—90 |
| 2,725,474 | 11/1955 | Hupp | 192—90 |
| 2,845,820 | 8/1958 | Brown, et al. | 18—.2 X |
| 3,028,737 | 4/1962 | Rudisch | 192—90 X |
| 3,172,515 | 3/1965 | Wrensch | 192—90 |

ARTHUR T. McKEON, *Primary Examiner.*